United States Patent [19]

Kishigami et al.

[11] 3,888,193

[45] June 10, 1975

[54] INCINERATION METHOD FOR COMBUSTIBLE INDUSTRIAL WASTAGE AND A FLUIDIZED BED FURNACE USED THEREFOR

[75] Inventors: Kunio Kishigami; Hiroshi Kobayashi, both of Yokohama; Shigenobu Oshima, Kawasaki, all of Japan

[73] Assignee: Babcock-Hitachi K.K., Tokyo, Japan

[22] Filed: Jan. 10, 1974

[21] Appl. No.: 432,239

[30] Foreign Application Priority Data

Jan. 16, 1973 Japan.................................. 48-6642

[52] U.S. Cl................. 110/8 F; 110/8 A; 110/28 J
[51] Int. Cl............................................... F23g 5/00
[58] Field of Search......... 110/8 R, 8 C, 18 R, 28 J, 110/1 J; 122/4 D

[56] References Cited
UNITED STATES PATENTS

| | | |
|---|---|---|
| 2,459,836 | 1/1949 | Murphree .............................. 122/4 |
| 2,729,428 | 1/1956 | Milmore ................................ 122/4 |
| 3,589,313 | 6/1971 | Smith et al............................. 110/8 |
| 3,717,700 | 2/1973 | Robinson et al....................... 110/1 |
| 3,763,830 | 10/1973 | Robinson et al...................... 110/28 |

*Primary Examiner*—Kenneth W. Sprague
*Attorney, Agent, or Firm*—Thomas E. Beall, Jr.

[57] ABSTRACT

There are disclosed an incineration method and a fluidized bed furnace for use in the treatment of industrial waste, in which combustible industrial wastage pieces are carried under heating in the fluidized medium of cement clinker granules for incineration, while acid gases contained in a waste gas accruing from the incineration of the wastage are reacted with clinker granules to thereby fix acid gases in clinker granules, whereby acid gases may be removed from the aforesaid waste gas. According to the method and furnace of the invention, toxic acid gases produced during the incineration of the wastage may be removed effectively, without causing public nuisance or atmospheric pollution, while keeping a long run operation.

8 Claims, 1 Drawing Figure

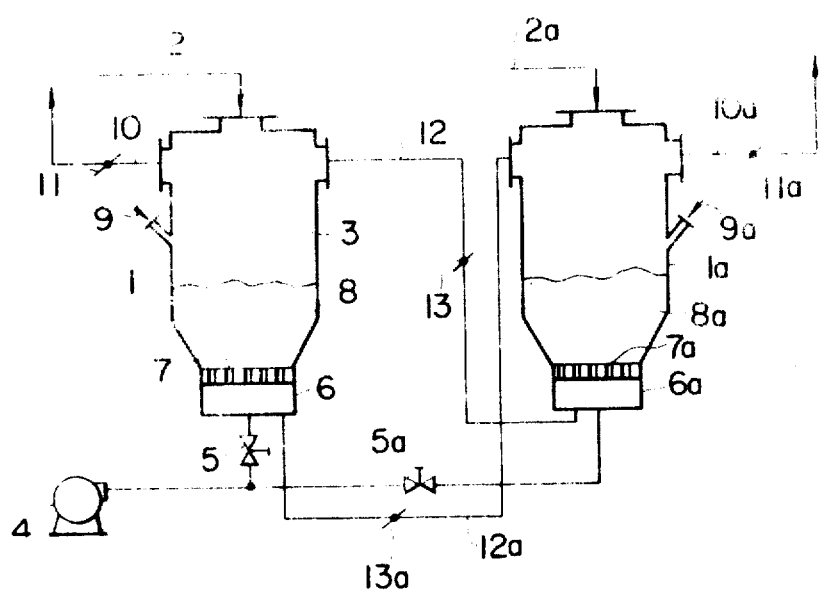

INCINERATION METHOD FOR COMBUSTIBLE INDUSTRIAL WASTAGE AND A FLUIDIZED BED FURNACE USED THEREFOR

BACKGROUND OF THE INVENTION

1. Filed of the Invention

This invention relates to an incineration method and a fluidized bed furnace for use in treating combustible industrial wastage, wherein cement clinker is used as a fluidizing medium for carrying said wastage therein on incineration.

2. Description of the Prior Art

Hitherto, a fludized bed furnace for use on incineration of combustible wastage has principally used inert materials, such as river sand, as a fluidizing medium. However, such a conventional apparatus suffers from disadvantages causing public nuisance or atmospheric pollution, because the wastage to be subjected to incineration treatment contains sulfur, or chlorine or nitrogen as in the case of wastage of plastics, and upon incineration of such wastage, there will be produced toxic acid gases such as sulfur dioxide ($SO_2$), sulfur trioxide ($SO_3$), hydrogen chloride (HCl), nitrogen oxides (NOx), etc. which in turn are discharged as waste gas from stacks, thus causing public nuisance or atmospheric pullution. This further dictates separate apparatus as means for removing such toxic acid gases from the waste gas.

To overcome such drawbacks, there has been developed a method, wherein calcium carbonate ($CaCO_3$) as a fluidized medium can suffice the dual purposes, a fluidized bed and the removal of the aforesaid toxic gases from the waste gas.

This method, however, only meets partial success, partly because calcium carbonate is gradually broken or collapsed to fine powder during its service, and as a result, the fine powder thus produced is discharged from stacks, being contained in the waste gas therefrom causing air pollution and partly because such powder adheres to molten materials to be incinerated and grows up to a certain thickness thereon, with the result that such calcium carbonate has to be replaced in a relatively short cycle or supplied repeatedly in great quantities.

It is accordingly a principal object of the invention to provide a method for use in the incineration of combustible industrial wastage which tends to produce toxic acid gases such as sulfur oxides, hydrogen chloride, nitrogen oxides, etc. upon incineration, whereby the aforesaid toxic gases may effectively be removed from the waste gas, with the resultant minimized public nuisance or atmospheric pollution.

It is another object of the invention to provide a fluidized bed furnace adapted for use in the aforesaid method, which requires no replacement of fluidizing medium even during the continuous end long run operation.

SUMMARY OF THE INVENTION

Briefly stated, according to the present invention, there are provided an incineration method and a fluidized bed furnace for use in incinerating industrial wastage, wherein combustible industrial wastage pieces are carried under heating in the fluidizing medium of cement clinker for incineration, while toxic acid gases contained in the waste gas accruing from the incineration of the aforesaid industrial wastage are brought into reaction with clinker, whereby toxic acid gases can be effectively removed from said waste gas.

BRIEF DESCRIPTION OF THE DRAWING

The single FIGURE is a systemmatic diagram of piping between two fluidized bed furnaces according to the present invention.

DETAILED DESCRIPTION OF THE PREFERRED EMBODIMENTS

The present invention is based on the discoveries that cement clinker has desired heat-resisting property and high resisting quality to breakage and is chemically active at high temperature to acid gases such as sulfur oxide, hydrogen chloride, nitrogen oxides, etc. and that the aforesaid cement clinker may be used as a fluidizing medium in a fluidized bed furnace.

Now, description will be given in detail on the composition of the fluidizing medium and the properties thereof, which may be employed in the present invention.

For manufacturing clinker, a mixture of lime stone (main component: $CaCO_3$) and clay (main components: $SiO_2$, $Al_2O_3$, $Fe_2O_3$), to which when necessary, is added a desired amount of iron oxide ($Fe_2O_3$) due to the shortage of $Fe_2O_3$ in clay, is roasted at a high temperature of 1,400° to 1,600°C to obtain clinker. This clinker has grain-size distribution ranging from 0.1 to 30 mm in diameter, such that the clinker is then crushed by means of a breaker and sieved to obtain clinker granules of a grain size of 0.1 to 3 mm which is suitable for use as a fluidizing medium.

The clinker granules thus obtained have an average composition consisting, in weight percent, of from 62 to 66% CaO, from 1 to 2% MgO, from 20 to 25% $SiO_2$, from 4 to 6% $Al_2O_3$, from 2 to 4% $Fe_2O_3$, and from 1 to 2% $SO_3$. The principal component thereof is a strong basic quick lime (CaO).

On the other hand, conventional river sand which is inactive chemically has an average composition consisting, in weight percent, of from 70 to 90% $SiO_2$ and the balance of 10 to 30%, and the principal component thereof is silicon dioxide ($SiO_2$) which is chemically stable and nearly neutral.

Because the aforesaid clinker granules are prepared by roasting at a high temperature a mixture of limestone with $Fe_2O_3$ (and the like) and further because of the components in the mixtures serving as solvents, the clinker granules thus produced present great mechanical strength which is incomparable to that of the conventional CaO solid.

The composition of clinker itself consists of:

| | |
|---|---|
| Aritte phase (3 CaO—$SiO_2$ system solid solution) | 20 to 65% |
| Beritte phase (2 CaO—$SiO_2$ system solid solution) | 10 to 55%, |
| Ferrite phase (4 CaO—$Al_2O_3$—$Fe_2O_3$ system solid solution) | 9 to 15%, and |
| 3 CaO—$Al_2O_3$ system solid solution | 5 to 10%. |

Description will now be given on chemical activities, heat resisting properties and mechanical strengths of clinker granules and river sand, hereinafter.

The clinker granules and river sand are crushed to fine powder by using a mortar and 1%, by weight, of the aforesaid fine powder is added to a pure water under sufficient agitation, respectively. pH of the supernatant liquid is measured at room temperature. The results of tests are as follows:

| River sand | 7.5 to 8.5 pH |
|---|---|
| Clinker granules | 12 to 13 pH |

The supernatant solution of the river sand is almost neutral, while that of the clinker granules exhibits a strong basicity.

This reveals that, unlike river sand, the clinker granules presents a strong reactivity (chemical activity) with acid matters such as $SO_2$ gas, $SO_3$ gas, HCl gas, and other acids, due to its chemical composition.

In case ammonium sulfate $(NH_4)_2 SO_4$ is mixed with clinker granules and river sand at a ratio of 1:2 in amount, respectively, and heated in a crucible to a temperatures of 800°C and 1,000°C, respectively, the resultant rate of reaction with the sulfate radical $(SO_4^{--})$ was found to be as follows:

| River sand | 1 to 3% |
|---|---|
| Clinker granules | 85 to 95% |

This represents substantial difference in the rate of reaction between the two. This is well explained by the following reaction:

$$CaO + (NH_4)_2SO_4 \rightarrow CaSO_4 + H_2O\uparrow + 2 NH_3\uparrow$$

Accordingly, since industrial wastage generally contains sulfur component or, as the case may be, chlorine component, the clinker granules present the following advantages, when used as a fluidizing medium in incineration of wastage. For instance, in the case of sulfur being contained;

$$CaO + S + 3/2 O_2 \rightarrow CaSO_4,$$

thus the sulfur component may be fixed as gypsum $(CaSO_4)$ which presents no public nuisance.

On the other hand, in the case of chlorine component being contained;

$$CaO + HCl \rightarrow CaCl_2 + H_2O,$$

thus the chlorine component may be fixed as calcium chloride $(CaCl_2)$ which presents no public nuisance.

Again, with the conventional case where the industrial wastage is incinerated with river sand being used as a fluidizing medium, since the river sand has no chemical activity, as has been described as above, there will be produced $SO_2$ or $SO_3$ gas from sulfur component, while chlorine component will be turned into HCl gas and discharged, being carried on combustion gas to atmosphere, resulting in atmospheric pollution.

Recently, however, the regulation for preventing atmospheric pollution has become more and more strict, such that it is a common practice that $SO_2$, $SO_3$ and HCl gases are removed by resorting to washing and absorption with expensive caustic soda (NaOH) solution in a scrubber.

It should be noted, however, that the present invention uses inexpensive clinker granules in place of expensive caustic soda, and thus presents considerable economy.

The temperature limit in service, of river sand is 1,000° to 1,100°C. The application of river sand at a temperature exceeding the above limit results in the failure of its use as a fluidizing medium, because the river sand will be molten at such high temperature.

In contrast thereto, clinker granules has a heat-resisting property of 1,400° to 1,450°C higher than that of the river sand, and this high heat resistance thereof contributes in the feasibility of reaction with toxic gases and deodorization of the waste gas by means of decomposition of offensive odor sources.

In case the industrial wastage containing a great amount of alkali metals (Li, K, Na), such as for instance, pulp effluent, is subjected to incineration in a fluidized bed furnace, with the river sand being used as a fluidized bed, then the river sand will be melted and solidified, and thereby the river sand will become no longer usable, according to the following reaction:

$$SiO_2 + Na_2CO_3 \rightarrow Na_2SiO_3 + CO_2.$$

Since the clinker is of a strong basicity itself and presents high heat resisting property, the clinker will not cause such a fusion reaction, even if it is used at a temperature as high as 1,000°C.

It should be again noted that the clinker, as used in the present invention, finds the best use in the incineration of wastage containing alkali metals such as those contained in the pump effluent.

The fluidized medium granules should have a high mechanical strengths at high temperature. The mechanical strengths of the river sand and clinker granules are as follows:

| At 800°C: | |
|---|---|
| River sand | 4.0 to 6.0 kg/mm² |
| Clinker granules | 2.0 to 3.0 kg/mm² |
| At 900°C: | |
| River sand | 2.5 to 3.5 kg/mm² |
| Clinker granules | 2.0 to 3.0 kg/mm² |

The above list reveals that the clinker exhibits no drop in strength at 1,000°C and above, thus presenting good applicability.

The limestone granules (principal component: $CaCO_3$) presents a high chemical activity at an elevated temperature, while presenting mechanical strength as low as 0.2 to 0.3 kg/mm² at 1,000°C, which corresponds to one fourth to one sixth of that of the cement clinker, and hence the limestone granules present considerable degree of wear, when in application. Accordingly, the limestone granules are not recommendable for such an application. As has been already clear, the cement clinker can be said to be excellent in this respect, as well.

These and other objects and features of the fluidized bed furnace using clinker granules as a fluidizing medium will be described in further detail with respect to the accompanying drawings.

The industrial wastage which has been crushed to a suitable size is transferred by way of a transfer route 2 into a furnace chamber 3 of the fluidized bed furnace 1. The high pressure air from a blower 4 is fed by way of a valve 5 to air chamber 6 and then introduced through a perforated plate 7 for fluidizing a medium 8. It should be noted that according to the present invention, clinker granules are used as the fluidizing medium 8.

In this case, since the fluidizing medium 8 is heated by means of an auxiliary burner means 9, the wastage may be incinerated rapidly and positively, while the toxic gases such as $SO_2$ and the like will react with the fluidized medium 8 consisting of clinker granules, whereby the majority thereof may be removed from a combustion gas.

In case a single fluidized bed furnace 1 is used, the waste gas is transferred by way of a pipe 10 and damper 11 to atmosphere. In general, however, two fluidized bed furnaces are used in combination alternately.

In case where the content of toxic gases in the waste gas is desired to be eliminated further completely and effectively, fluidized bed furnace 1a is used with the furnace 1, wherein a hot waste gas from the furnace 1 is introduced by way of pipe 12 and damper 13 to an air chamber 6a of the fluidized bed furnace 1a, with the damper 11 being closed. Then, the waste gas is introduced through a perforated plate 7a into the furnace chamber of furnace 1a for being fluidized and heated the medium 8a, whereby the toxic gas remaining in the waste gas from the fluidized bed furnace 1 may be fixed and removed by the medium 8a. The waste gas, from which toxic gases have been removed in a sufficient amount is discharged by way of pipe 10a and a damper 11a to atmosphere. In other words, the first fluidized bed furnace 1 is used as a furnace for incinerating wastage and removing toxic gases, while the fluidized bed furnace 1a is exclusively used as a furnace for removing toxic gases.

In this case, if the pressure air from the blower 4 is fed to an air chamber 6a in the fluidized bed furnace 1a, with the valve 5a being opened, the unburnt gas components contained in the waste gas from the furnace 1 may be burnt within the furnace 1a, and toxic gases may be removed.

Furthermore, in case the furnace 1a is used as a furnace for a combination of incineration and removing toxic gases, pipe 12a and damper 13a are used, wastage enters by way of transfer route 2a, damper 11a is closed, and burner means 9a is operated, while the furnace 1 is used only as a furnace for removing toxic gases.

Still furthermore, another attempt is that a third fluidized bed furnace 1b is provided, and then pipes are connected between furnace 1a and furnace 1b (not shown) and between furnace 1b and furnace 1, in the same manner as in the case between the furnace 1 and the furnace 1a. Thus, if the toxic-gas fixing capability of the medium 8 in the furnace 1 becomes close to saturation, the operation of the furnace 1 will be stopped, and then the furnace 1a is switched to the wastage-incinerating-and-toxic-gas-removing furnace, while the furnace 1b is switched to the furnace for exclusively removing toxic gases. In this manner, the furnace 1a may be readily set to operation, since the furnace 1a has been preheated by waste gas from the furnace 1, thus the switching of furnaces from one to another may be readily accomplished. During the idle time of the operation of furnace 1, the medium may be replaced. If the switching of the furnace is thus carried out, a continuous removal of toxic gases may be accomplished.

Description has been given thus far on the fact that the cement clinker is effective for removing toxic gases such as sulfur oxides and hydrogen chlorides, etc. However, the cement clinker is also effective for removing nitrogen oxides produced in the incineration of combustible industrial wastage containing nitrogen as component. In this respect, it is considered that nitrogen may be fixed as calcium cyanamide ($CaCN_2$) or calcium nitride ($Ca_3N_2$).

Briefly stated, the present invention presents an incineration method and a fluidized bed furnace for use in incinerating industrial wastage, in which cement clinker is used as a fluidizing medium, which clinker is obtained by roasting a mixture of limestone, clay, silica and the like, and in which acid gases such as $SO_2$, $SO_3$, HCl, NOx, and the like generated at the time of incineration may be fixed and removed by the clinker. In addition, the clinker granules may be used at a temperature of 1,100°C and above, higher than that used in the case of the river sand being used as a fluidizing medium, such that the wastage may be incinerated rapidly, without resultant atmospheric pollution and generation of offensive odor. Furthermore, because of the clinker having a considerable anti-collapsing property, continuous incinerating operation for a long time may be effected. Still furthermore, if a plurality of furnaces are used, there will be achieved a further complete elimination of atmospheric pollution i.e., the removal of toxic gases in the aforesaid manner.

It will be understood that the above description is merely illustrative of preferred embodiments of the invention. Additional modifications and improvements utilizing the discoveries of the present invention can be readily anticipated by those skilled in the art from the present disclosure, and such modifications and improvements may fairly be presumed to be within the scope and purview of the invention as defined by the claims that follow.

What is claimed is:

1. A method for incinerating combustible industrial wastage, comprising the steps of: fluidizing the combustible industrial wastage with cement clinker granules serving as a fluidizing medium; heating the fluidized combustible industrial wastage and cement clinker granules sufficiently to incinerate the combustible industrial wastage and thereby generate combustion waste gases from the combustible industrial wastage as it is incinerated, which combustible waste gases include acid gases; contacting the combustion waste gases thus generated by the incineration of the combustible industrial wastage, which combustion waste gases include acid gases, with the fluidized cement clinker granules sufficiently to react the acid gases with the cement clinker granules and thereby remove the acid gases from the combustion waste gas.

2. A method as defined in claim 1, wherein the cement clinker granules are provided with a composition before reaction, by weight percentage, of from 62 to 66% CaO, from 1 to 2% MgO, from 20 to 25% $SiO_2$, from 4 to 6% $Al_2O_3$, from 2 to 4% $Fe_2O_3$, and from 1 to 2% $SO_3$.

3. A method as defined in claim 2, wherein the cement clinker granules are provided with a grain size distribution before reaction with a range of from 0.1 to 3mm in diameter.

4. A method as defined in claim 3, wherein said step of heating is carried out at a temperature between 800° C and 1,450° C.

5. A method as defined in claim 1, wherein the cement clinker granules are provided with a grain size distribution before reaction with a range of from 0.1 to 3mm in diameter.

6. A method as defined in claim 5, wherein said step of heating is carried out at a temperature between 800° C and 1,450° C.

7. A method as defined in claim 1, wherein said step of heating is carried out at a temperature between 800° C and 1,450° C.

8. A method as defined in claim 7, wherein the cement clinker granules are provided with a composition before reaction, by weight percentage, of from 62 to 66% CaO, from 1 to 2% MgO, from 20 to 25% $SiO_2$, from 4 to 6% $Al_2O_3$, from 2 to 4% $Fe_2O_3$, and from 1 to 2% $SO_3$.

* * * * *